United States Patent
Anghel et al.

(10) Patent No.: US 8,097,968 B2
(45) Date of Patent: Jan. 17, 2012

(54) POSITION-CONTROLLED START FROM THE AC LINE USING A SYNCHRONOUS MACHINE

(75) Inventors: Cristian E. Anghel, Oro Valley, AZ (US); Mingzhou Xu, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 1060 days.

(21) Appl. No.: 11/962,672

(22) Filed: Dec. 21, 2007

(65) Prior Publication Data

US 2010/0308581 A1 Dec. 9, 2010

(51) Int. Cl.
*H02K 19/26* (2006.01)
*H02P 9/14* (2006.01)
*H02P 9/42* (2006.01)

(52) U.S. Cl. ............. 290/31; 322/61; 318/140; 318/151

(58) Field of Classification Search ............ 290/31, 290/32, 46, 47; 322/10, 46, 47, 44, 59, 89, 322/61; 318/87, 139, 140, 147, 151, 153; 310/184

See application file for complete search history.

(56) References Cited

U.S. PATENT DOCUMENTS

| | | | |
|---|---|---|---|
| 3,902,073 A | 8/1975 | Lafuze | |
| 4,743,777 A * | 5/1988 | Shilling et al. | 290/46 |
| 5,546,742 A | 8/1996 | Shekhawat | |
| 5,594,322 A | 1/1997 | Rozman et al. | |
| 6,252,331 B1 | 6/2001 | Mildice et al. | |
| 7,105,937 B2 * | 9/2006 | Hoppe et al. | 290/38 R |
| 7,184,927 B2 * | 2/2007 | Anghel et al. | 318/400.04 |
| 7,227,271 B2 * | 6/2007 | Anghel et al. | 290/31 |
| 7,242,105 B2 | 7/2007 | Mehl et al. | |
| 7,514,806 B2 * | 4/2009 | Xu et al. | 290/31 |
| 7,687,928 B2 * | 3/2010 | Taneja et al. | 290/36 R |
| 2006/0061336 A1 * | 3/2006 | Anghel et al. | 322/59 |
| 2006/0249956 A9 * | 11/2006 | Thomson et al. | 290/34 |
| 2007/0222220 A1 * | 9/2007 | Huang et al. | 290/31 |
| 2008/0023966 A1 * | 1/2008 | Kumar | 290/40 C |
| 2009/0174188 A1 * | 7/2009 | Huang et al. | 290/46 |
| 2009/0243417 A1 * | 10/2009 | Xu et al. | 310/184 |
| 2009/0309364 A1 * | 12/2009 | Marconi | 290/52 |
| 2010/0207590 A1 * | 8/2010 | Anghel et al. | 322/61 |

* cited by examiner

*Primary Examiner* — Eduardo Colon Santana
(74) *Attorney, Agent, or Firm* — Miriam Jackson, Esq.

(57) ABSTRACT

A synchronous electric machine operates as a starter-generator for an aircraft. When operating in a starting mode, a main stator of the machine is supplied with electrical power at a constant frequency. An exciter stator is supplied with variable frequency power. As rotational speed increases, the exciter variable frequency changes correspondingly to maintain synchronous operation of the machine and maximum torque. In a generator mode, variable frequency is applied to the exciter stator with the exciter frequency varying as a function of rotational speed of an engine driving the machine. This provides for a constant frequency output from the machine.

13 Claims, 7 Drawing Sheets

US 8,097,968 B2

POSITION-CONTROLLED START FROM THE AC LINE USING A SYNCHRONOUS MACHINE

BACKGROUND OF THE INVENTION

The present invention is in the field of control of electrical machines and, more particularly, control of electrical machines employed for starting a turbine engine and for generating electrical power with the engine.

In a prior-art electrical system, a starter-generator may function as a machine to impart initial rotation of the engine. After the engine is running under its own power, the starter-generator may function as a generator to supply electrical power. Such a system may be employed in an aircraft.

Aircraft designs are continuously evolving. One concept of this design revolution has become known as "more electric aircraft" (MEA). In the context of MEA designs, starter-generator designs have evolved from simple brush-type direct current machines into newer designs of starter-generators which may be brushless synchronous machines.

As compared to brush-type DC machines, prior-art brushless synchronous machines may provide higher starting torque and long term reliability. But prior-art operation of a synchronous machine as a starter requires input of high-amperage variable frequency power. In a prior art synchronous machine, variable frequency power may be applied to a main-stator to produce a variable rotor speed. This variable frequency power must be provided with high-power converters, typically having a current capacity in excess of 200 amperes. Such high-power converters and their associated controls may add complexity, expense and weight to an aircraft.

A starter-generator on an aircraft may be driven by a turbine engine that may vary in speed during operation of the aircraft. When a prior-art synchronous machine is employed as an engine-driven generator, its output frequency may vary as a function of engine speed. Power conversion systems may be employed to convert variable frequency current into constant frequency current that may be used by aircraft electrical systems. Such prior-art conversion systems may employ high-power rectifiers and inverters which may add complexity, cost and weight to the aircraft.

As can be seen, there is a need to eliminate a requirement for high-power converters in a vehicle that employs a brushless synchronous starter-generator (i.e. electric) machine. Additionally, there is a need to provide such a starter-generator which may be driven with constant-frequency electrical power to produce starting torque over a variable speed range. Also there is a need to generate constant frequency power with such a machine while driving the machine at a variable speed.

SUMMARY OF THE INVENTION

In one aspect of the present invention an apparatus for producing variable speed mechanical power with constant frequency electrical power comprises a synchronous electric machine with main-stator windings for receiving electrical power at a constant frequency, and main-rotor windings. A controller varies angular velocity of a main-rotor flux phasor as a function of angular velocity of a rotor of the machine to maintain a quadrature relationship between the main-rotor flux phasor and a main-stator flux phasor produced by the constant frequency electrical power applied to main-stator windings.

In another aspect of the present invention a starter-generator apparatus comprises an electric machine operable as a motor and a generator. The electric machine comprises a main stator for receiving or providing constant frequency electrical power, a rotor rotatable at a variable angular velocity, main-rotor windings and an exciter stator for receiving variable frequency electrical power and for inducing a variable speed rotating main-rotor flux phasor in the main-rotor windings. A controller varies frequency of electrical power provided to the exciter stator as a function of angular velocity of the rotor so that a main-stator flux phasor is maintained in a desired positional relationship with the main-rotor flux phasor.

In still another aspect of the present invention a method for operating a starter-generator comprises the steps of determining angular velocity of a rotor of the starter-generator, applying electrical power to an exciter stator of the starter-generator at a variable frequency that is a function of the angular velocity of the rotor, applying electrical power to a main stator of the starter-generator at a constant frequency to produce torque in the rotor when the starter-generator is in a starter mode and applying torque to rotate the rotor at a variable angular velocity to produce electrical power at a constant frequency when the starter-generator is in a generator mode.

These and other features, aspects and advantages of the present invention will become better understood with reference to the following drawings, description and claims.

BRIEF DESCRIPTION OF THE DRAWINGS

FIGS. 2-1 through 2-3 are details of configurations of an alternate embodiment of windings in accordance with the invention;

FIG. 3 is a graphical illustration of control functions for the machine of FIG. 1 at a first angular velocity in accordance with the invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in controlling electric machine operation. More particularly, the present invention may provide machine control for a brushless synchronous electric machine operating at a variable speed. The present invention may be particularly useful in aircraft and aerospace vehicles which employ such machines as starter-generators.

In contrast to prior-art machine control systems, which employ high-power inverters, the present invention may, among other things, provide variable speed machine control by providing variable frequency power to an exciter of the machine. The present invention, instead of applying or extracting variable frequency at a main-stator of the machine, may apply or extract constant frequency power at the main-stator while applying variable frequency power to a stator of the exciter of the machine. The frequency of power applied to the exciter stator may be varied as a function of rotational speed of the machine to maintain synchronous operation of the machine when the machine may operate in a starting mode.

Figure 1:
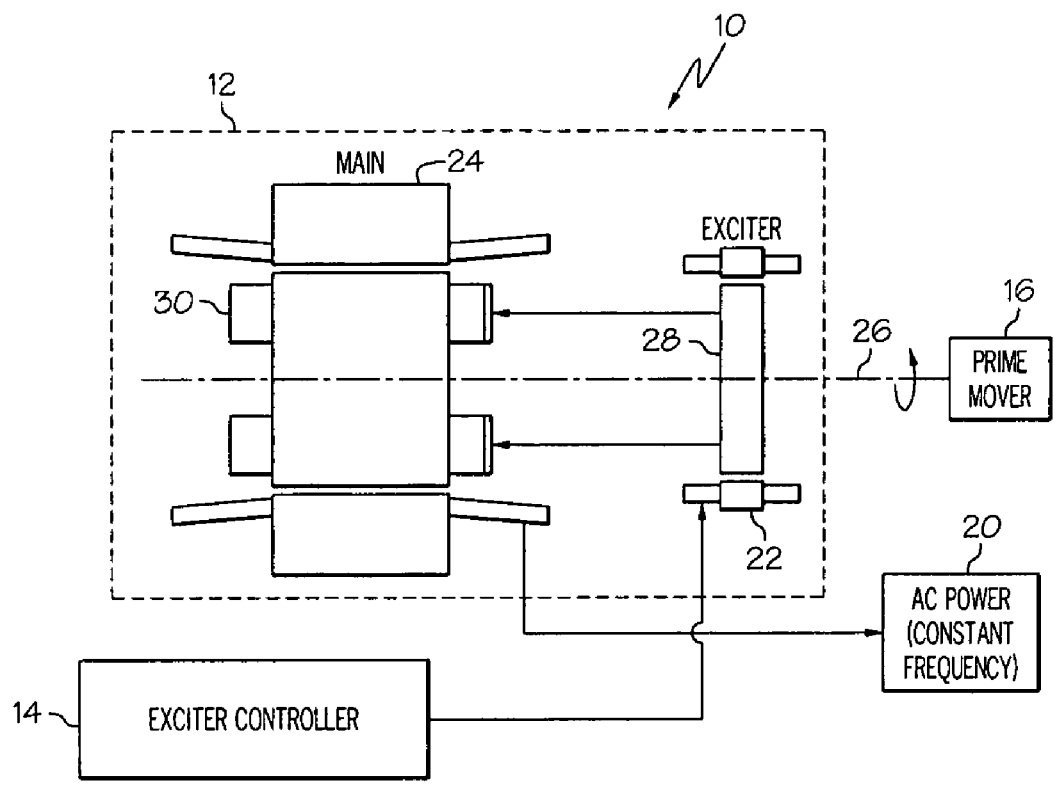
FIG. 1 is a block diagram of an electric machine operating as a motor in accordance with the invention.
Figure 2:
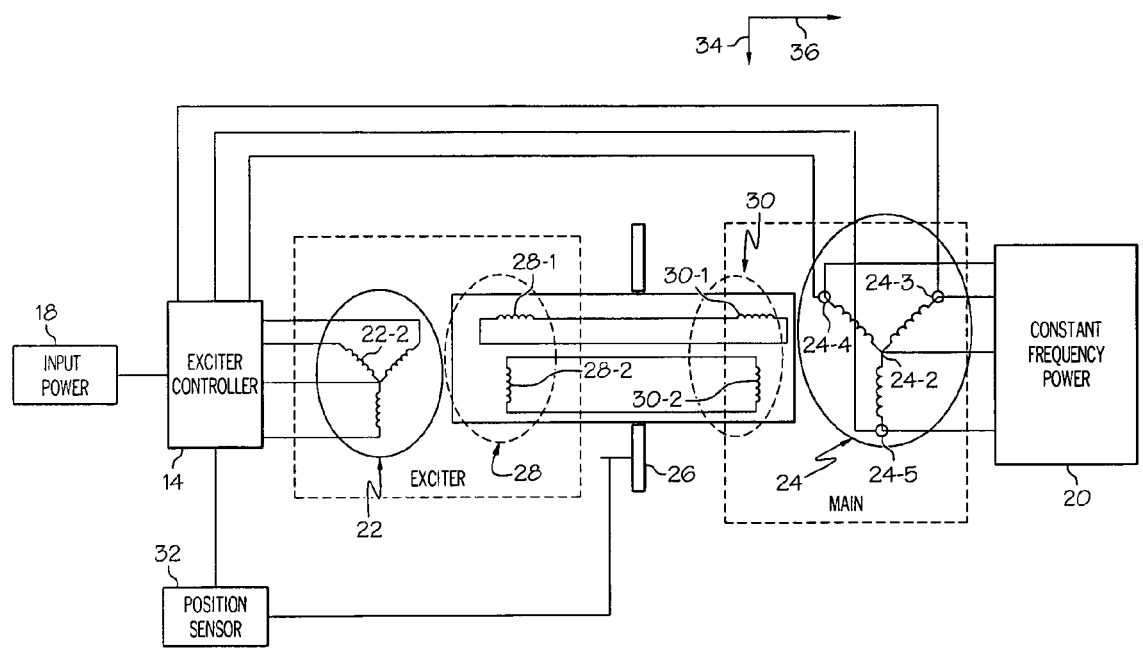
FIG. 2 is a block diagram of internal aspects of the machine of FIG. 1 in accordance with the invention.
Figures 1, 2:
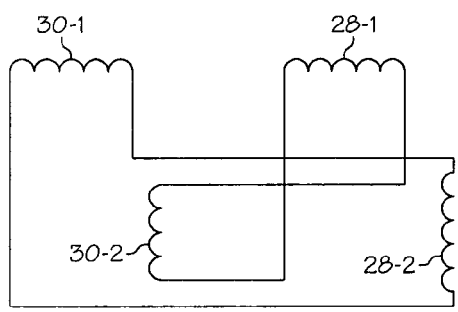
Figure 2:
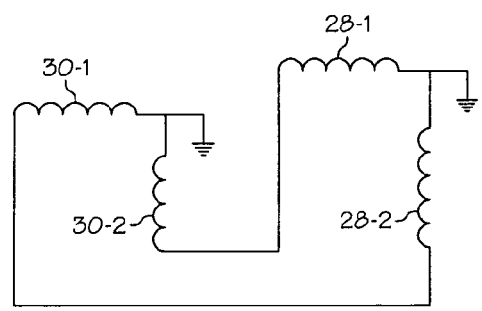

Referring now to FIGS. 1 and 2, a machine-control system is designated generally by the numeral 10. The system 10 may comprise a machine 12 and an exciter controller 14. In an exemplary embodiment, the machine 12 may comprise a starter-generator for an aircraft (not shown).

The system 10 may be herein described, in an exemplary operating mode, as a starting system for a prime mover such as an engine 16 of the aircraft. In that context, the exciter controller 14 may be supplied power from a power source 18 and a main stator 24 of the machine 12 may be supplied with power from a starter power source 20.

The machine 12 may comprise an exciter-stator 22, the main-stator 24 and a rotor 26. The main-stator 24 may comprise main-stator windings 24-2. The machine 12 may also comprise two sets of windings on the rotor 26; exciter-rotor windings 28 and main-rotor windings 30. The exciter-stator 22 may comprise exciter-stator windings 22-2.

Referring now to FIG. 2, it may be seen that the main-rotor windings 30 may comprise a first winding 30-1 and a second winding 30-2. The first and second winding 30-1 and 30-2 may be oriented orthogonally to each other. The exciter-rotor windings 28 may comprise a first winding 28-1 and a second winding 28-2. The windings 28-1 and 28-2 may also be oriented orthogonally to each other. The exciter-rotor windings 28 may be electrically interconnected with the main-rotor windings 30. Various configurations of interconnection of the windings 28 and 30 may be utilized in the present invention. Some exemplary configurations are illustrated in FIG. 2-1 and FIG. 2-2. In FIG. 2-1, an inverse interconnection is illustrated. In FIG. 2-2 a direct interconnection is illustrated.

It has been found that an inverse interconnection as illustrated in FIG. 2-1 may be particularly effective for one of the machines 12 that may be employed as a starter-generator of an aircraft. In an inversely interconnected configuration, the main-rotor windings 30 and the main-rotor flux phasor 34 may correspond in frequency and may have a rotational direction opposite to an exciter-rotor flux phasor induced by the electric power applied to the exciter-stator windings 22-2.

Figures 2, 3:
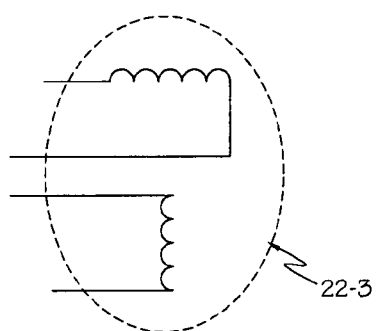
Figure 3:
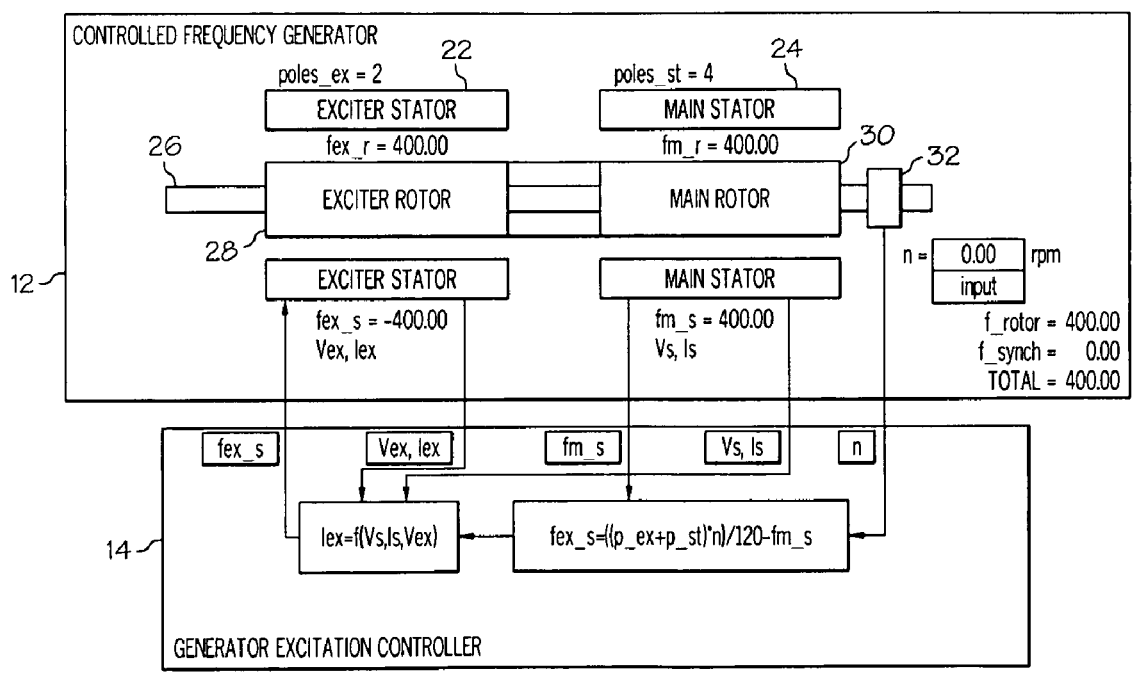
Figure 4:
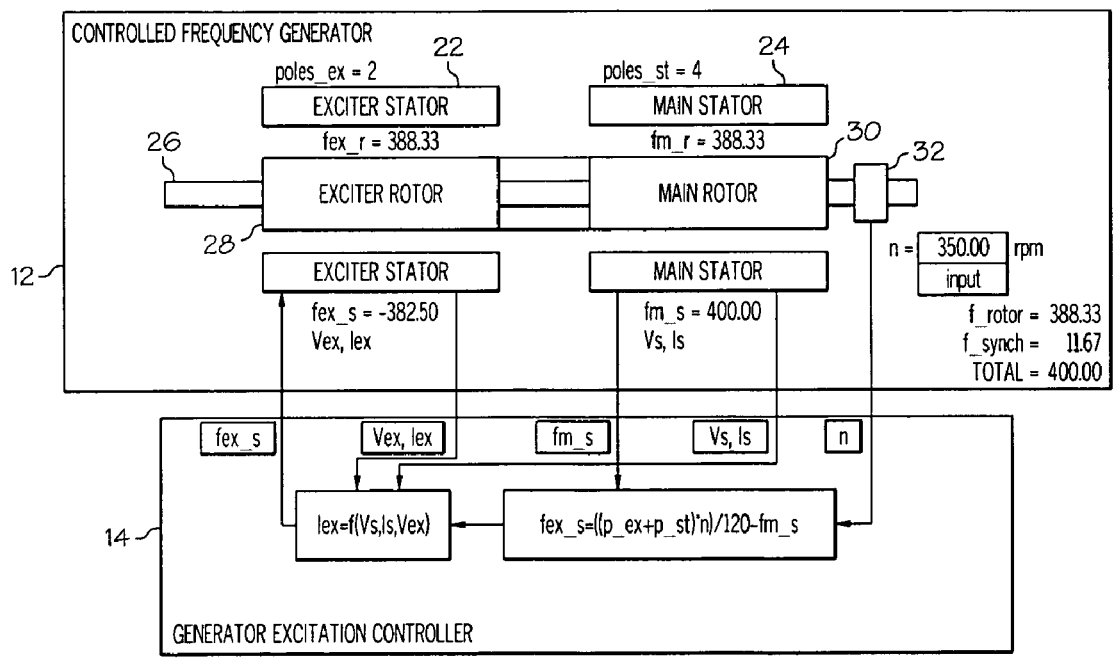
FIG. 4 is a graphical illustration of control functions for the machine of FIG. 1 at a second angular velocity in accordance with the invention.

The exciter-stator windings 22-2 and the main-stator windings 24-2 may be multi-phase windings. An exemplary three-phase embodiment of the exciter-stator winding 22-2 is illustrated in FIG. 2. An exemplary three-phase embodiment of the main-stator winding 24-2 is also shown in FIG. 2. The exciter-stator windings 22-2 may also be configured as two phase windings 22-3 as shown in FIG. 2-3.

The number of phases of the main-stator windings 24-2 may be selected to correspond with a type of starting power that the machine 12 may provided or may be expected to produce when it may operate in a generator mode. In the exemplary embodiment of FIG. 2, the windings 24-2 may be three-phase windings for three-phase power.

It may be seen that when alternating current is applied to the exciter-stator windings 22-2, a rotating exciter-stator flux phasor (not shown) may develop. Consequently, an exciter-rotor flux phasor (not shown) may be induced in the exciter-rotor windings 28. Because the exciter-rotor windings 28 may be directly interconnected with the main-rotor windings 30, a first flux phasor (not shown) may also be induced in the main-rotor windings 30. The rotor windings 28 and 30 may be two orthogonally oriented phase windings.

It may also be seen that when alternating current is applied to the main-stator windings 24-2, a rotating main-stator flux phasor 34 may develop.

The alternating current applied to the exciter-stator windings 22-2 may have a first frequency. The alternating current applied to the main-stator windings 24-2 may have a second frequency. Interactions between the main rotor windings 30 and the main stator windings 24-2 may combine in an additive or a subtractive manner as a function of a relationship among the first and the second frequencies to produce a main-rotor flux phasor 36.

Referring now to FIG. 3, it may be understood how the machine 12 may produce starting torque over a variable-speed range while the main stator 24 is supplied with constant-frequency electrical power. In FIG. 3, the main-stator windings 24-2 may be provided an electrical power input at an exemplary constant frequency of 400 Hertz (Hz) by the power source 20. The main-stator 24 may have an exemplary four pole configuration. The exciter-stator 22 may have an exemplary two pole configuration.

Connection of the main-stator 24 to the constant-frequency power source 20 may produce a rotating field in the main-stator windings 24-2 (i.e., the main-stator flux phasor 34). In the present example frequency of power provided to the main-stator 24 may be 400 Hz. Generically, this frequency may be designated fm_s. It may be seen then that the main-stator flux phasor 34 may rotate with an angular velocity that corresponds to 400 Hz. At any given time, the main-stator flux phasor 34 may have a defined position relative to main stator 24. In the exemplary embodiment of FIG. 3, the rotor 26 may have rotational speed of zero revolutions per minute.

The exciter-stator windings 22-2 may be supplied with power at a controlled frequency and angular position. As a consequence, angular velocity and angular position of the exciter-stator flux phasor may be controlled. Also angular velocity and angular position of the induced main-rotor flux phasor 36 may thus be controlled. When the main-rotor flux phasor 36 and the main-stator flux phasor 34 rotate at the same angular velocity, the machine 12 may be considered to operate synchronously. Angular velocity of the main-rotor flux phasor 36 may be a function of the frequency of excitation current applied to the exciter-stator 22. For synchronous operation of the machine 12 an excitation frequency may be determined by the expression:

$$fex\_s = ((p\_ex + p\_st) * n)/120 - fm\_s \qquad (1)$$

where fex_s is exciter-stator frequency;
where p_ex is a number of poles of the exciter-stator;
where p_st is a number of poles of the main-stator;
where n is a rotational speed of the rotor; and
where fm_s is a frequency of power applied to the main-stator.

A rotor-position sensor 32 may be attached to the rotor 26 to sense a rotational speed and rotational position of the rotor 26. The rotor-position sensor 32 may provide rotor speed and position data to the exciter controller 14. It may be noted that rotor speed and position may also be determined with various sensorless methods known to those skilled in the art. The exciter controller 14 may provide a controlled output to the exciter-stator 22.

In the above described zero-speed case, fex_s may be −400 Hz. At zero speed, the main-rotor windings 30 may be subjected to force resulting from an interaction of the main-rotor flux phasor 36 and the main-stator flux phasor 34. This force may vary as a function of a positional relationship of the phasors 34 and 36. The force may be maximized if the two phasors 34 and 36 are in a quadrature relationship, i.e., if their relative phases differ by 90 degrees. The resultant force may generate torque on the rotor 26.

As soon as the rotor 26 begins to rotate in response to the torque, the main-rotor windings 30 may also rotate. If no further action were taken, the rotating main-rotor phasor 36 may no longer be in a synchronous relationship with the rotating main-stator flux phasor 34. This might result in the phasors no longer having a desired positional relationship. In that case, produced torque may diminish or indeed may be entirely eliminated.

However, the controller 14 may be operated, responsively to position signals from the rotor position sensor 32, to vary the frequency of exciter current, i.e., fex_s, as a function of rotor speed n.

Referring now to FIG. 3, it may be seen that as rotor speed n increases, fex_s may be changed in accordance with equation 1. For example if rotor speed n were to become 350 rpm, then fex_s may become −382.5 Hz. At a frequency of −382.5 Hz, the rotating main-stator flux phasor 34 may rotate, relative to the rotor 26, at 350 rpm. Thus the main-rotor flux phasor 36 may remain in synchronous relationship with the main-stator flux phasor 34. However the main-rotor flux phasor 36 and the main-stator flux phasor 34 may remain 90 degrees apart and maximum produced torque may be maintained.

This may be further understood by considering that the frequency of the main-rotor flux phasor 36, fex_r, may be equal to a difference (or sum, depending on polarity) between the frequency fex_s and the frequency produced on the main-rotor windings 30 by rotation of the rotor 26. This relationship may be expressed as:

$$fex\_r = (p\_ex * n)/120 - fex\_s \quad (2)$$

In the present example, a 350 rpm rotational speed of the rotor 26 may provide that fex_r=388.33 Hz. But because the rotor 26 may be rotating at 350 rpm, a synchronous frequency fsynch_s relative to the main-stator 24 may be expressed as:

$$fsynch\_s = (p\_st * n)/120 \quad (3)$$

In the present example, a 350 rpm rotation may provide that fsynch_s=11.67 Hz. In other words, a stationary observer on the main-stator 24 may observe a relative rotor flux frequency being a sum of fex_r (e.g., 388.33 Hz) and fsynch_s (e.g., 11.67 Hz) or a total of 400 Hz. This may mean that the main-rotor flux phasor 36 is synchronous with the main-stator flux phasor 34. When the main-rotor flux phasor 36 and the main-stator flux phasor 34 are maintained in a quadrature relationship, using rotor position information, maximum torque may be developed in the rotor 26.

Referring back to FIG. 2, it may be seen that a desired quadrature relationship between the main-rotor flux phasor 36 and the main-stator flux phasor 34 may be maintained with the controller 14. The phase of excitation current may be controlled as function of the stator voltage, rotor angle and excitation voltage. Position of main-rotor flux phasor 36 may be controlled based on the main-stator flux phasor 34 position. Position of main-stator flux phasor 34 may be determined by sensing stator currents with the current transformers 24-3, 24-4 and 24-5 From the stator currents information, the position of a stator current phasor may be determined by employing a zero crossing method.

Because the position of the stator current phasor may correspond with the main-stator flux phasor 34 position, this stator current phasor position information may be employed by the controller 14 to provide the current control of the exciter-stator 22. Current in the exciter-stator 22 may be controlled so that the main-rotor current phasor may be kept 90 degrees shifted from the main-stator current phasor. This current control may force the main-rotor flux phasor 36 to be 90 degrees shifted from the main-stator flux phasor 34 and therefore maximum electromagnetic interaction (i.e., torque) may generated by the machine 12.

The resultant torque may move the rotor 26, and excitation may be controlled continuously to keep the two frequencies fex_s and fex_r interrelated to maintain the 90 degrees shift between the main-rotor and the main-stator fluxes. The machine 12 may continue to rotate faster and faster and to accelerate to a desired speed while the excitation frequency fex_s may be decreasing.

Control of fex_s may be performed by supplying current at relatively low amperage to the exciter stator 22. For an exemplary one of the machines 12 used to start an aircraft engine, a converter capacity of about 10 amperes may be sufficient to provide the desired controlled excitation. This may be compared to about 200 amps of converter capacity that might be needed to perform engine starting with prior-art brushless synchronous machines. This is because engine starting may be performed in accordance with the present invention by applying constant frequency power to the main stator 24. Constant frequency power may be supplied directly from a conventional ground power unit or a conventional aircraft auxiliary power unit. There may be no need to perform power conversion for such power and high-capacity inverters and rectifiers may not be required on an aircraft that employs the present inventive starting system.

Figure 5:
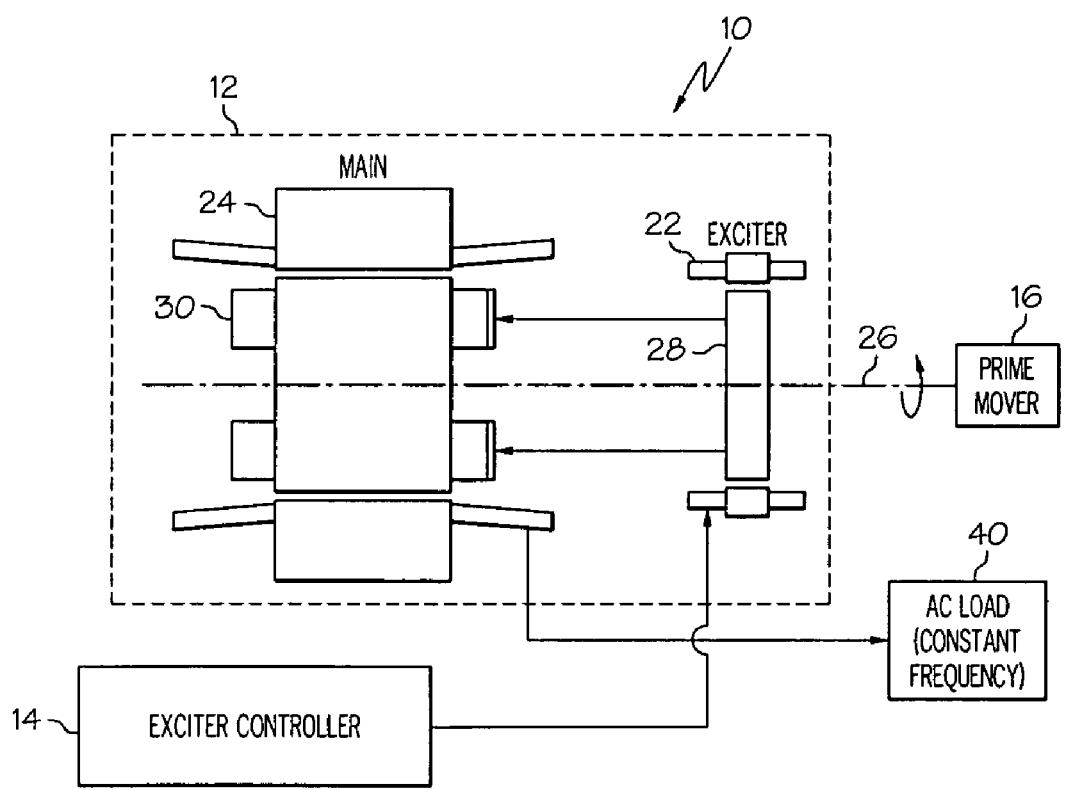
FIG. 5 is a block diagram of the electric machine of FIG. 1 operating as a generator.

Referring now to FIG. 5, it may be seen that the machine 12 may produce constant-frequency electrical power and supply the power to a load 50. The engine 16 may drive the rotor 26 at varying speeds. The sensor 32 of FIG. 3 may provide requisite information to the exciter controller 14 so that the main-rotor flux phasor 36 may remain in quadrature relationship with the main-stator flux phasor 34. As a result torque provided by the engine 16 may produce maximized electrical power in the main stator 24.

Figure 6:
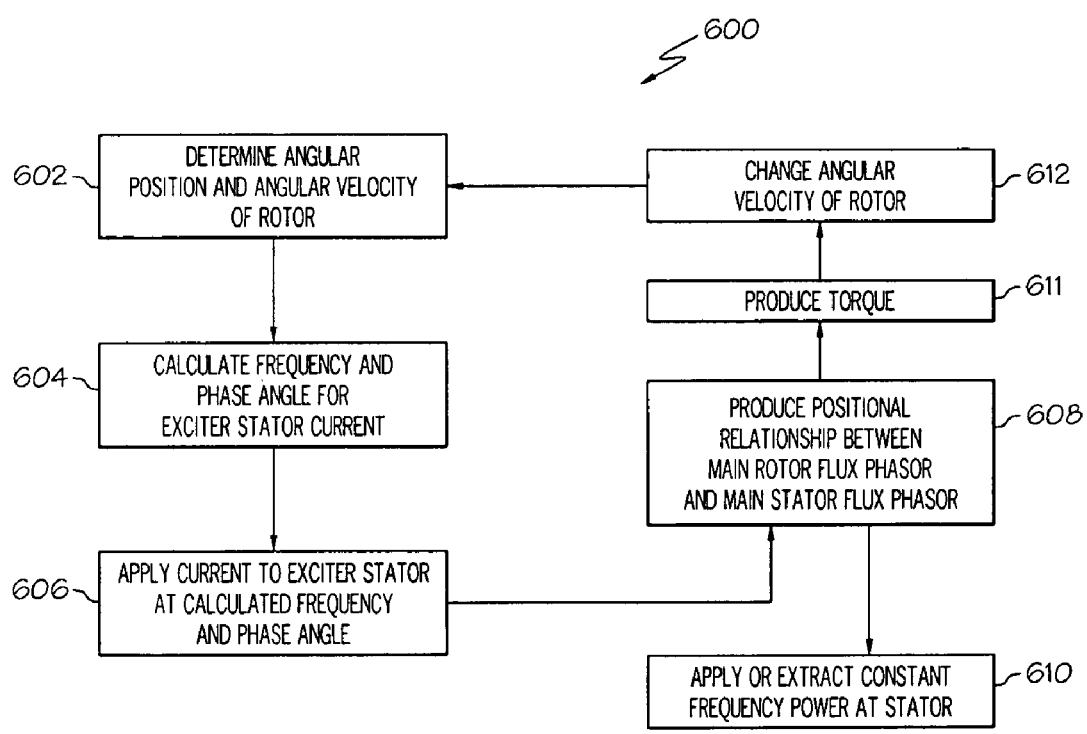
FIG. 6 is a flow chart of a method in accordance with the invention.

Referring now to FIG. 6, an exemplary method 600 for practicing the present invention is illustrated in a flow chart. In a step 602 angular velocity of a rotor of a synchronous machine may be determined (e.g., the sensor 32 may sense angular velocity of the rotor 26). In a step 604, an excitation frequency and phase may be calculated as a function of the determined angular velocity of the rotor (e.g., the controller 14 may perform calculations based on the equations 1, 2 and 3). In a step 606, current with a controlled frequency and phase may be applied to an exciter stator of the synchronous machine (e.g., constant frequency power from the power supply 18 may be converted in the controller 14 to variable frequency power at a frequency determined in step 604). In a step 608, a desired positional relationship between a rotor flux phasor and a stator flux phasor may be produced (e.g., a quadrature relationship may be produced by inducing a main-rotor flux phasor 36 an angular velocity that is a function of the frequency determined in step 604).

In a step 610, constant frequency power may be applied to, or extracted from, a main stator of the synchronous machine (e.g., the main stator 24 may be connected with the power supply 20 or the load 40). In a step 611, torque may be produced. In a step 612 the angular velocity of the rotor may change (e.g., the starting or driving speed of the engine 16 may change). In the event of an angular velocity change occurring in the step 610, the step 602 may be re-initiated. Consequently the power applied or extracted in step 610 may be constant frequency power.

It should be understood, of course, that the foregoing relates to exemplary embodiments of the invention and that modifications may be made without departing from the spirit and scope of the invention as set forth in the following claims.

We claim:

1. Apparatus for producing torque over a variable speed range with constant frequency electrical power comprising:
    a synchronous electric machine comprising;
        multi-phase main-rotor windings;
        main-stator windings configured to receive electrical power at a constant frequency;
        an exciter stator; and
        exciter-rotor windings inversely interconnected electrically with the main-rotor windings; and
    a controller for varying angular velocity of a main-rotor flux phasor as a function of angular velocity and position of a rotor of the machine to maintain a desired positional relationship between the main-rotor flux phasor and a main-stator flux phasor produced by the constant frequency electrical power applied to main-stator windings.

2. The apparatus of claim 1 wherein the exciter stator is configured to produce the main-rotor flux phasor responsively to the controller.

3. The apparatus of claim 2 wherein:
    the exciter-stator is configured to receive variable frequency power from the controller; and
    the exciter-rotor windings are electrically interconnected with the main-rotor windings so that the main-rotor flux phasor is induced by a rotating exciter-stator flux phasor.

4. The apparatus of claim 2 wherein the controller determines an exciter-stator frequency in accordance with the expression:

$$fex\_s = ((p\_ex + p\_st) * n)/120 - fm\_s$$

where fex_s is exciter-stator frequency;
where p_ex is a number of poles of the exciter-stator;
where p_st is a number of poles of the main-stator;
where n is a rotational speed of the rotor; and
where fm_s is a frequency of power applied to the main-stator.

5. The apparatus of claim 4 wherein the main-rotor windings are two-phase windings.

6. A starter-generator apparatus comprising:
    an electric machine operable as a motor and a generator, the electric machine comprising;
        a main stator configured to receive or provide constant frequency electrical power;
        a rotor rotatable at a variable angular velocity;
        main-rotor windings;
        an exciter stator configured to receive variable frequency electrical power and for inducing a variable speed rotating main-rotor flux phasor in the main-rotor windings; and
        exciter-rotor windings being inversely interconnected electrically with the main-rotor windings so that the main-rotor flux phasor corresponds in frequency and has an angular velocity and direction opposite to an exciter-rotor flux phasor induced by the electric power applied to the exciter-stator windings; and
    a controller for varying frequency of electrical power provided to the exciter stator as a function of angular velocity of the rotor so that a main-stator flux phasor is maintained in a desired positional relationship with the main-rotor flux phasor.

7. The apparatus of claim 6 further comprising exciter-rotor windings being directly interconnected electrically with the main-rotor windings so that the main-rotor flux phasor corresponds in frequency and angular velocity with an exciter-rotor flux phasor induced by the electric power applied to the exciter-stator windings.

8. The apparatus of claim 6 wherein the main-rotor and exciter-rotor windings comprise multi-phase windings.

9. The apparatus of claim 8 wherein the main-rotor and exciter rotor windings are two phase windings.

10. The apparatus of claim 9 wherein the main-rotor and exciter rotor windings comprise first and second windings oriented orthogonally to each other.

11. The apparatus of claim 6 further comprising current transformers for detecting stator current.

12. The apparatus of claim 6 wherein:
    the main-stator windings are three phase windings; and
    the exciter-stator windings are three phase windings.

13. The apparatus of claim 6 wherein:
    the main-rotor windings are two phase windings; and
    the exciter-rotor windings are two phase windings.

* * * * *